United States Patent
Dahlheimer

(10) Patent No.: US 7,887,062 B2
(45) Date of Patent: Feb. 15, 2011

(54) RADIAL SHAFT SEAL WITH LARGE RADIAL OFFSET ACCOMMODATION

(75) Inventor: John C. Dahlheimer, Laconia, NH (US)

(73) Assignee: Freudenberg-NOK General Partnership, Plymouth, MI (US)

(*) Notice: Subject to any disclaimer, the term of this patent is extended or adjusted under 35 U.S.C. 154(b) by 365 days.

(21) Appl. No.: 11/736,639

(22) Filed: Apr. 18, 2007

(65) Prior Publication Data

US 2008/0258406 A1   Oct. 23, 2008

(51) Int. Cl.
*F16J 15/32* (2006.01)
(52) U.S. Cl. ...................................... 277/572
(58) Field of Classification Search ............... 277/559, 277/569, 572
See application file for complete search history.

(56) References Cited

U.S. PATENT DOCUMENTS

| | | | |
|---|---|---|---|
| 1,416,988 A | 5/1922 | Sherwood | |
| 1,733,416 A | 10/1929 | Lebesnerois | |
| 1,797,223 A | 3/1931 | Annis | |
| 2,249,141 A | 7/1941 | Johnson | |
| 2,482,029 A * | 9/1949 | Reynolds | 277/504 |
| 2,743,950 A | 5/1956 | Helfrecht et al. | |
| 4,000,933 A | 1/1977 | Derman et al. | |
| 4,274,641 A | 6/1981 | Cather, Jr. | |
| 4,553,763 A | 11/1985 | Ehrmann | |
| 4,750,748 A | 6/1988 | Visser | |
| 5,370,404 A * | 12/1994 | Klein et al. | 277/572 |
| 5,509,667 A * | 4/1996 | Klein et al. | 277/565 |
| 6,726,211 B1 * | 4/2004 | Kuroki et al. | 277/353 |
| 2006/0138729 A1 * | 6/2006 | Arai et al. | 277/559 |
| 2008/0284110 A1 * | 11/2008 | Dahlheimer | 277/551 |

* cited by examiner

*Primary Examiner*—Shane Bomar
*Assistant Examiner*—Gilbert Y Lee
(74) *Attorney, Agent, or Firm*—Ronald W. Wangerow, Esq.; Harness, Dickey & Pierce, P.L.C.

(57) ABSTRACT

A radial shaft seal is provided for accommodating large radial offset of the shaft relative to a housing. The seal includes an annular retainer insert provided for engaging the seal to a fixed housing. An annular elastomeric seal body is molded to the retainer insert and includes flexible axially extending portion extending from an inner surface of the retainer insert. A seal portion extends axially from a radially inward end of the radially inwardly extending portion and includes a seal lip with a garter spring disposed radially outward of the sealing lip and an elastomeric bearing surface disposed adjacent to the sealing lip. The bearing surface includes a plurality of raised pads adapted to engage the shaft. The pads each include a rounded edge on lateral sides thereof for encouraging the creation of a lubricating film between the pads and shaft. The pads are lubricated by direct exposure to the fluid being sealed.

24 Claims, 2 Drawing Sheets

RADIAL SHAFT SEAL WITH LARGE RADIAL OFFSET ACCOMMODATION

FIELD

The present disclosure relates to radial shaft seals and more particularly, to a radial shaft seal which can accommodate for a large radial offset.

BACKGROUND AND SUMMARY

The statements in this section merely provide background information related to the present disclosure and may not constitute prior art.

Radial shaft seals are commonly provided for sealing between a housing and a rotary shaft passing through the housing. One problem with radial shaft seals is that shaft offset or other misalignment and/or dynamic run out conditions relative to the housing bore can cause the seal lip to be unable to follow and thus lift off the shaft, allowing fluid to escape and leak past the seal. Accordingly, the present disclosure provides a radial shaft seal capable of accommodating large amounts of shaft misalignment, radial offset and dynamic run out.

The radial shaft seal of the present disclosure provides an annular outer rigid insert adapted to reinforce an elastomeric rind portion surrounding and extending axially along the tubular portion of the outer rigid insert to effect a sealing press-fit into the interior of a housing bore. The elastomeric rind portion terminates and wraps inward around an inward radiating wall end portion of the outer rigid insert where the elastomer forms into a tubular flex portion that extends axially, which is radially spaced from, and which runs generally parallel inside the tubular portion of the outer rigid insert. This tubular flex portion terminates and is attached to an outward radiating wall of an annular inner rigid insert adapted to surround and reinforce an elastomeric bearing portion of the seal. The elastomer continues from the tubular flex portion inward along an outward radiating wall end of the inner rigid insert and then flows axially along and around the outside of the tubular portion of the inner rigid insert where it joins with the elastomer of the reinforced bearing portion to form a flexible seal lip that hugs and seals around the shaft, this sealing action intensified and assured by a garter spring mounted around the flexible seal lip.

The reinforced elastomeric bearing portion includes a plurality of raised ribs the innermost bearing surfaces of which lie tangentially to the shaft surface and which have either a flat or slightly convex shape but which includes rounded edges at the intersection of the sides of the raised ribs and the bearing surfaces. The bearing surfaces of the ribs form an acute angle with the surface of the shaft which facilitates the carrying of liquid fed from the grooves between the ribs and which forces the fluid into the acute angles thus wedging the fluid between the reinforced elastomeric bearing interior surfaces and the shaft exterior creating a full film elastohydrodynamic lubrication regime between the reinforced bearing interior and the shaft exterior. The reinforced bearing portion being attached to the adjacent flexible seal lip causes the bearing and seal lip portions to be held circular and concentric, and to track true to the shaft being sealed regardless of considerable shaft to bore misalignment, offset and dynamic run out, thus assuring excellent sealing efficiency.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
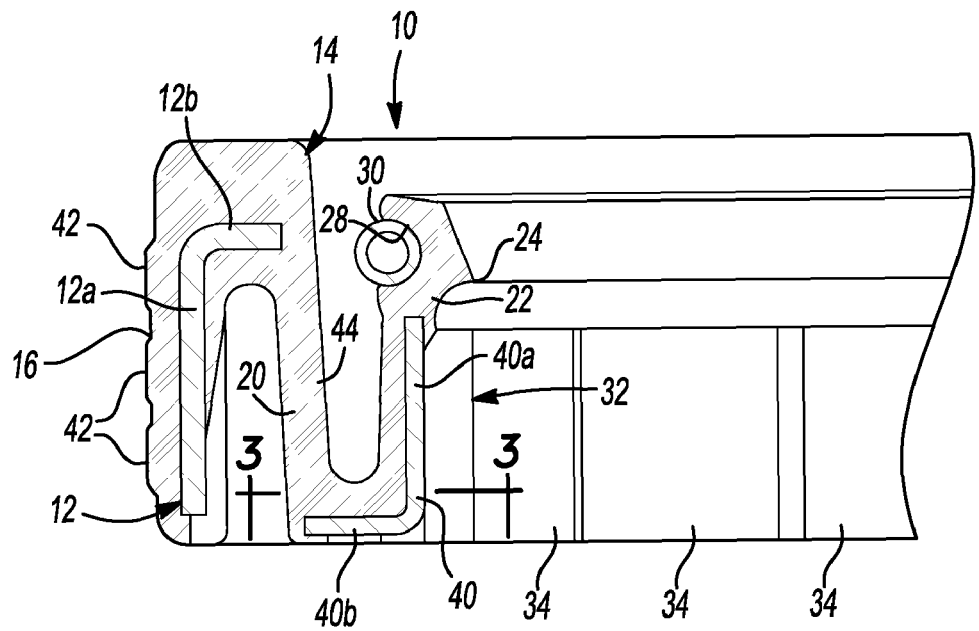
FIG. 1 is a cross-sectional view of a radial shaft seal according to the principles of the present disclosure.
Figure 2:
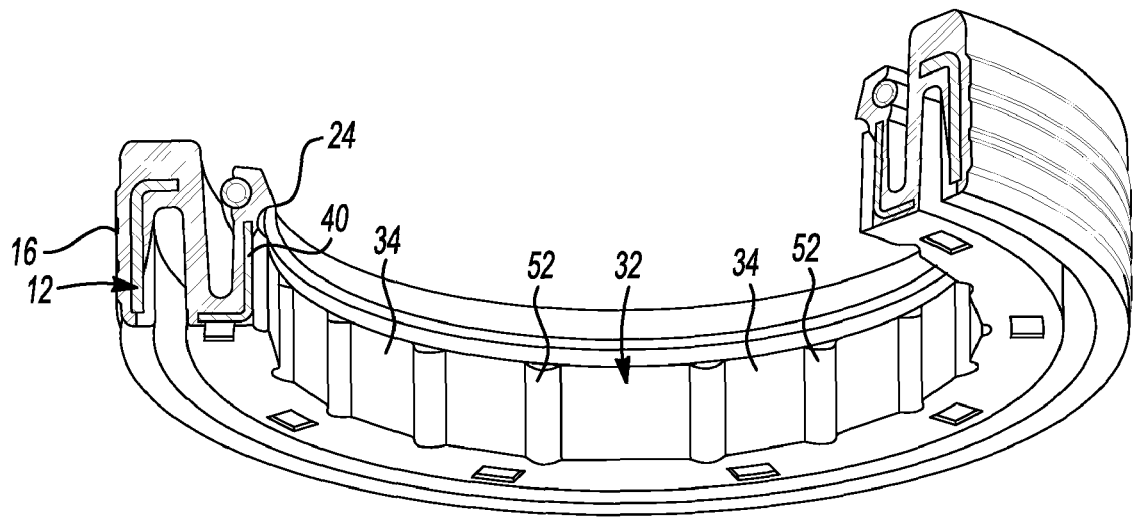
FIG. 2 is a partial cut away perspective view of the radial shaft seal of FIG. 1.
Figure 3:
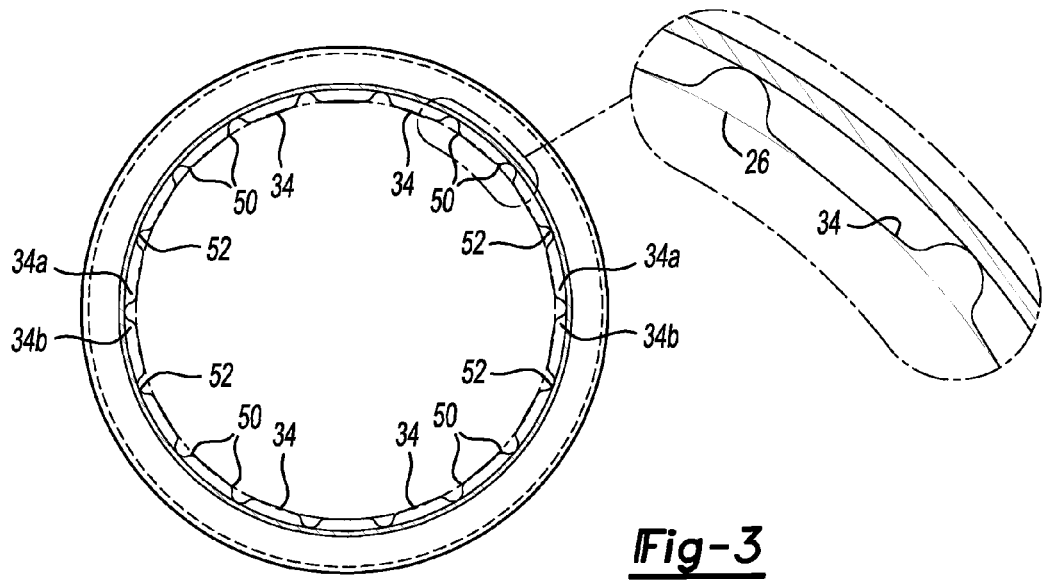
FIG. 3 is a partial cross-sectional view taken along line 3-3 of FIG. 1, illustrating the raised pads of the bearing surface according to the principles of the present disclosure.
Figure 4:
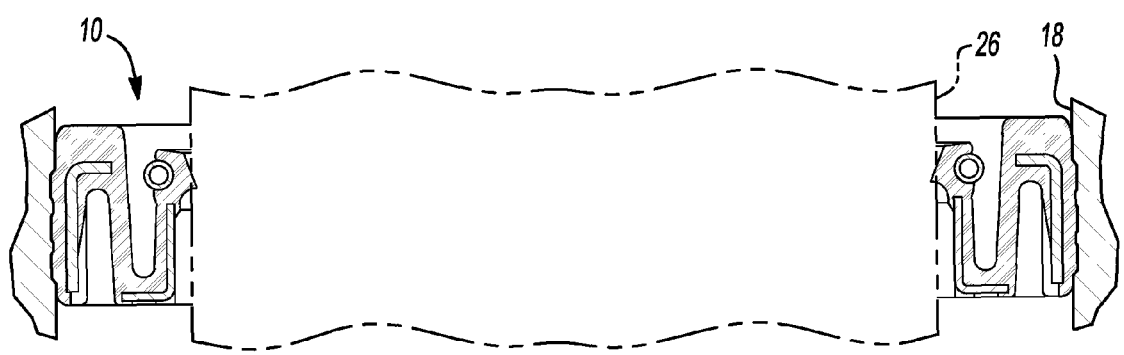
FIG. 4 is a cross-sectional view of the radial shaft seal according to the principles of the present disclosure engaging a shaft having zero offset relative to a housing.
Figure 5:
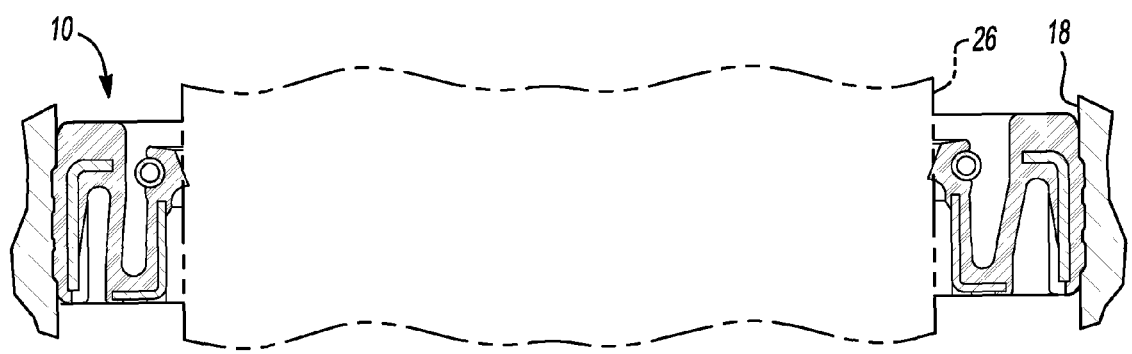
FIG. 5 is a view similar to FIG. 4 illustrating the shaft having a radial offset that is accommodated for by the radial shaft seal.

With reference to FIGS. 1-5, a radial shaft seal 10 according to the principles of the present disclosure will now be described. As shown in FIG. 1, the radial shaft seal 10 includes an annular retainer insert 12 having an annular elastomeric seal body 14 molded to the retainer insert 12. The seal body includes an over-molded portion 16 molded to the retainer insert 12 while providing a sealed connection with a housing 18 as best illustrated in FIGS. 4 and 5.

A flexible thin walled flex section portion 20 extends axially from an inner surface of the retainer insert 12. A seal portion 22 extends axially from a radially inward end of the flex section portion 20 and includes a seal lip 24 extending radially inwardly for engaging a shaft 26. A spring recess 28 is provided radially outward of the seal lip 24 and receives a garter spring 30 therein. An elastomeric bearing portion 32 is disposed adjacent to the sealing lip 24. The bearing portion 32 includes a plurality of raised pads 34 which engage the shaft 26. The seal portion 22 includes an annular seal insert 40 embedded within the elastomeric material of the seal portion radially outward from the bearing portion 32.

The annular retainer insert 12 can include a generally L-shaped cross-section with a radially outermost axially extending portion 12a and a radially inwardly extending portion 12b extending from an end of the axially extending portion 12a. The retainer insert 12 provides a rigid support for the elastomeric material 16 over-molded to the outer surface thereof for providing a sealed engagement with the housing. The over-molded portion 16 can include one or more raised beads 42 for enhancing the sealing engagement.

The thin walled flex section 20 includes an axially extending portion 44 that allows the bearing portion 32 and seal portion 22 to move inward and outward along with the shaft as illustrated in FIG. 5 to accommodate for shaft offset.

The raised pads 34 of the elastomeric bearing portion 32 can each include a rounded edge 50 on lateral sides 34a, 34b thereof. A plurality of axially extending grooves 52 are disposed between the plurality of raised pads. The rounded edges 50 provided on the lateral sides 34a, 34b of the raised pads 34 allow oil or other lubricating materials to form a film between the pads 34 and shaft 26 without scraping away the lubricating film. In the embodiment shown, eighteen pads 34 are utilized, although it should be understood that more or fewer pads such as 6, 8, 10, 16, or 20 pads, etc. can be utilized so long as the bearing surface is capable of positioning and causing the sealing lip adjacent the bearing to be held circular and concentric to the shaft being sealed regardless of considerable shaft/seal offset. The pads may be either flat (as shown) or have a slightly convex shape which lie tangentially to the shaft and form an acute angle to it.

The rigid annular seal insert 40 can have an axially extending portion 40a disposed radially outward from the bearing portion that securely maintains the bearing portion 32 against the shaft 26. The insert 40 can also include a radially outwardly extending portion 40b to enhance its rigidity.

What is claimed is:

1. A radial shaft seal for providing a seal between a fixed housing and a rotating shaft, comprising:
   an annular retainer insert;
   an annular elastomeric seal body molded to said retainer insert, said seal body including an over-molded portion bonded to said retainer insert, a flexible axially extending leg extending from an inner surface of said retainer insert, and a seal portion extending axially from a radially inward portion of said flexible axially extending leg, said seal portion including an axially extending leg, an annular seal insert, a sealing lip with a garter spring disposed radially outward of said sealing lip, and an elastomeric bearing disposed adjacent to said sealing lip and having an engagement surface adapted to engage said shaft, said annular seal insert including an L-shaped cross-section with an axially extending leg disposed radially outward from said elastomeric bearing and a radially outwardly extending leg extending from said axially extending leg of said annular seal insert, said axially extending leg of said annular seal insert positioned radially outward from the engagement surface of said elastomeric bearing between said elastomeric bearing engagement surface and said axially extending leg of said seal portion such that said axially extending leg of said annular seal insert is spaced apart from said rotating shaft.

2. The radial shaft seal according to claim 1, wherein said annular retainer insert includes a generally L-shaped cross-section with a radially outermost axially extending retainer leg and a radially inwardly extending retainer leg extending from an end of said axially extending retainer leg of said annular retainer insert, said axially extending retainer leg being adapted to be mounted to a housing.

3. The radial shaft seal according to claim 1, wherein said elastomeric bearing includes a plurality of raised pads having the engagement surface adapted to engage the shaft.

4. The radial shaft seal according to claim 3, wherein said engagement surface of each of said plurality of raised pads includes a rounded edge adjacent lateral sides thereof.

5. The radial shaft seal according to claim 3, wherein said engagement surface of each of said plurality of raised pads includes a flat or slightly convex shape which lies tangentially to an engagement surface of the shaft and forms an acute angle to the engagement surface of the shaft such that portions of the engagement surface of each raised pad adjacent to the lateral sides thereof are spaced apart from the engagement surface of the shaft.

6. The radial shaft seal of claim 5, wherein said sealing lip is lubricated by the fluid being sealed which passes through the axially extending grooves before reaching the sealing lip.

7. The radial shaft seal according to claim 3, wherein said elastomeric bearing includes a plurality of axially extending grooves disposed between said plurality of raised pads.

8. The radial shaft seal of claim 3, wherein said elastomeric bearing raised pads are exposed directly to, and are lubricated by, the fluid being sealed.

9. The radial shaft seal according to claim 3, wherein said plurality of raised pads includes at least 6 pads.

10. The radial shaft seal according to claim 1, wherein said garter spring is disposed on an air side of the seal and is not immersed in, or directly wetted by, a liquid being sealed.

11. The radial shaft seal according to claim 1, wherein the pressure of a liquid being sealed acts radially inward on an exterior surface of said flexible axially extending leg, and acts radially outward on an interior surface of said sealing lip in closest proximity to said elastomeric bearing.

12. The shaft seal of claim 1, wherein said axially extending leg of said annular seal insert is embedded within elastomeric material of said seal portion so as to be positioned between said engagement surface of said elastomeric bearing and axially extending leg of said seal portion and spaced apart from said shaft.

13. An assembly comprising:
    a housing;
    a shaft rotatably mounted relative to said housing; and
    a radial shaft seal disposed between said housing and said shaft, said radial shaft seal including:
      an annular retainer insert; and
      an annular elastomeric seal body molded to said retainer insert, said seal body including an over-molded portion bonded to said retainer insert, a flexible axially extending leg extending from an inner surface of said retainer insert, and a seal portion extending axially from a radially inward end of said flexible axially extending leg, said seal portion including an axially extending leg, a sealing lip with a garter spring disposed radially outward of said sealing lip and an elastomeric bearing disposed adjacent to said sealing lip and engaged with said shaft and exposed directly to the fluid being sealed and lubricated by this fluid, said elastomeric bearing including a plurality of raised pads having an engagement surface engaged with a corresponding engagement surface of said shaft, each engagement surface of the plurality of raised pads having a flat or slightly convex shape that lies tangentially to the engagement surface of said shaft and forms an acute angle thereto such that portions of each engagement surface of each raised pad adjacent lateral sides thereof are spaced apart from the engagement surface of said shaft.

14. The assembly according to claim 13, wherein said annular retainer insert includes a generally L-shaped cross-section with a radially outermost axially extending retainer leg and a radially inwardly extending retainer leg extending from an end of said axially extending retainer leg of said annular retainer insert, said axially extending retainer leg being mounted to said housing.

15. The assembly according to claim 13, wherein said engagement surface of each of said plurality of raised pads includes a rounded edge adjacent lateral sides thereof.

16. The radial shaft seal of claim 13, wherein said sealing lip is lubricated by the fluid being sealed which passes through the axially extending grooves before reaching the sealing lip.

17. The assembly according to claim 13, wherein said elastomeric bearing includes a plurality of axially extending grooves disposed between said plurality of raised pads.

18. The assembly according to claim 13, wherein said seal portion includes an annular seal insert having an axially extending leg disposed radially outward from said elastomeric bearing between said elastomeric bearing engagement surface and said seal portion and spaced radially apart from said shaft.

19. The assembly according to claim 13, wherein said plurality of raised pads includes at least 6 pads.

20. The assembly according to claim 13, wherein said garter spring is disposed on an air side of the seal and is not immersed in or directly wetted by the liquid being sealed.

21. The assembly according to claim 13, wherein the pressure of the liquid being sealed acts radially inward on an exterior surface of said flexible axially extending leg, and acts radially outward on an interior surface of said sealing lip in closest proximity to said elastomeric bearing.

22. The shaft seal according to claim 13, wherein the portions of each engagement surface of each raised pad adjacent the lateral sides thereof include edge portions, the edge portions being spaced apart from the engagement surface of the shaft such that only a central portion of the engagement surface of each raised pad between the edge portions is engaged with the engagement surface of said shaft.

23. An assembly comprising:
- a housing;
- a shaft rotatably mounted relative to said housing; and
- a radial shaft seal disposed between said housing and said shaft, said radial shaft seal including:
  - an annular retainer insert; and
  - an annular elastomeric seal body molded to said retainer insert, said seal body including an over-molded portion bonded to said retainer insert, a flexible axially extending leg extending from an inner surface of said retainer insert, and a seal portion extending axially from a radially inward end of said flexible axially extending leg, said seal portion including an axially extending leg, a sealing lip with a garter spring disposed radially outward of said sealing lip, an elastomeric bearing disposed adjacent to said sealing lip and engaged with said shaft and exposed directly to the fluid being sealed and being lubricated by this fluid, and an annular seal insert, said elastomeric bearing including a plurality of raised pads having an engagement surface engaged with a corresponding engagement surface of said shaft, each engagement surface of the plurality of raised pads having a flat or slightly convex shape that lies tangentially to the engagement surface of said shaft and forms an acute angle thereto such that portions of each engagement surface of each raised pad adjacent lateral sides thereof are spaced apart from the engagement surface of said shaft;
  - wherein said annular seal insert includes an axially extending leg disposed radially outward from said elastomeric bearing between said elastomeric bearing engagement surface and said seal portion and spaced radially apart from said shaft and a radially outwardly extending leg extending from said axially extending leg of said annular seal insert.

24. The assembly according to claim 23, wherein said annular seal insert further includes an L-shaped cross-section.

* * * * *